US012798411B2

(12) United States Patent
Salter et al.

(10) Patent No.: US 12,798,411 B2
(45) Date of Patent: Nov. 17, 2026

(54) VEHICLE CHARGER CONTROL SYSTEM AND METHOD

(71) Applicant: Ford Global Technologies, LLC, Dearborn, MI (US)

(72) Inventors: Stuart Salter, White Lake, MI (US); Brendan Diamond, Grosse Pointe, MI (US); Annette Lynn Huebner, Highland, MI (US); Lucretia Williams, Bloomfield Hills, MI (US); Paul Kenneth Dellock, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 863 days.

(21) Appl. No.: 18/154,616

(22) Filed: Jan. 13, 2023

(65) Prior Publication Data

US 2024/0239216 A1 Jul. 18, 2024

(51) Int. Cl.

*H02J 7/00* (2026.01)
*B60L 53/18* (2019.01)
*B60L 53/35* (2019.01)
*B60L 53/60* (2019.01)
*H02J 7/14* (2006.01)

(52) U.S. Cl.

CPC ............... *B60L 53/18* (2019.02); *B60L 53/35* (2019.02); *B60L 53/60* (2019.02); *B60L 2250/20* (2013.01)

(58) Field of Classification Search

CPC .......... B60L 53/18; B60L 53/35; B60L 53/60; B60L 2250/20
USPC .......................................................... 320/132
See application file for complete search history.

(56) References Cited

U.S. PATENT DOCUMENTS

| | | | | |
|---|---|---|---|---|
| 10,717,367 | B1 * | 7/2020 | Price | B60L 53/30 |
| 12,157,383 | B1 * | 12/2024 | Pill | B60L 53/16 |
| 2015/0343912 | A1 * | 12/2015 | McNally | B60L 53/18 320/109 |
| 2016/0059718 | A1 * | 3/2016 | Adachi | H01M 10/42 320/109 |
| 2017/0001529 | A1 * | 1/2017 | Fuchs | B60L 53/65 |
| 2017/0330644 | A1 * | 11/2017 | Jung | C09D 153/02 |
| 2019/0001830 | A1 * | 1/2019 | Cao | G01B 5/25 |
| 2019/0217707 | A1 * | 7/2019 | Reber | B60L 5/02 |
| 2019/0217728 | A1 * | 7/2019 | Reber | B60L 53/18 |
| 2019/0237218 | A1 | 8/2019 | Heyne et al. | |
| 2019/0248250 | A1 * | 8/2019 | Lyutskanov | H04W 12/06 |
| 2020/0303093 | A1 * | 9/2020 | Cantz | H01R 9/11 |
| 2020/0317071 | A1 * | 10/2020 | Hakenberg | B60L 53/16 |
| 2021/0155105 | A1 * | 5/2021 | Alford | B60L 53/18 |
| 2021/0198093 | A1 * | 7/2021 | Graham | B60L 53/36 |
| 2022/0194236 | A1 * | 6/2022 | Whiting | B60L 53/16 |
| 2022/0404435 | A1 * | 12/2022 | Orbay | H01B 7/32 |
| 2023/0042880 | A1 * | 2/2023 | Baumbick | B60L 53/16 |
| 2023/0110777 | A1 * | 4/2023 | Neligan | B60L 53/66 320/109 |
| 2024/0092194 | A1 * | 3/2024 | Rosenblatt | B60L 53/16 |
| 2024/0100976 | A1 * | 3/2024 | Atlasman | B60L 53/31 |
| 2024/0279022 | A1 * | 8/2024 | Rosenblatt | B65H 75/4484 |

* cited by examiner

*Primary Examiner* — Alexis B Pacheco
(74) *Attorney, Agent, or Firm* — McCoy Russell LLP

(57) ABSTRACT

Methods and systems are provided for controlling pliability of vehicle charging cables. In one example, a pliability of vehicle charging cables is adjusted according to attributes of a human including but not limited to height and weight. The pliability of vehicle charging cables may be adjusted when the vehicle charging cables may be expected to be stiff.

20 Claims, 6 Drawing Sheets

VEHICLE CHARGER CONTROL SYSTEM AND METHOD

FIELD

The present description relates generally to methods and systems for charging an electric vehicle. The methods and systems may be particularly useful for vehicles that may be recharged at cold ambient conditions.

BACKGROUND/SUMMARY

An electric vehicle may operate and may be recharged at cold ambient conditions. The electric vehicle may be recharged at an outside charging station. The outside charging station may include charging cables that may stiffen as outside temperatures decrease. The charging cables may also be folded so that they may extend to reach extended distances. Stiffening of the charging cables when they are folded during cold ambient air temperatures may make it more difficult for some people to manipulate the charging cables into a charging position. However, other people may not have a problem manipulating the charging cables into the charging position at the same ambient temperature. The reason that some people may have less difficulty handling the charging cable may be due to their physical characteristics. For example, some taller people may be able to apply additional leverage to maneuver the charging cable. Further, some people may have greater physical strength as compared to other people. Even so, it may be desirable for a greater percentage of people to be able to handle the charging cable with greater ease during ambient cold temperatures.

The inventors herein have recognized the above-mentioned issues and have developed a vehicle system, comprising: a transmitting device; a controller including executable instructions that cause the controller to transmit to a charger, via the transmitting device, data that is a basis for adjusting pliability of a charging cable.

By transmitting data that is a basis for adjusting pliability of a charging cable to a charger or charging station, it may be possible to provide the technical result of adjusting pliability of a charging cable so that persons having less strength and/or leverage may have an easier time manipulating a charging cable to deliver charge to a vehicle charging port. In some examples, attributes of a person (e.g., height, weight, gender, disability, etc.) may be used to estimate a person's ability to handle and manipulate charging cables. The attributes of the person may then be used to adjust pliability of charging cables into a range where the person may be expected to be able to move the charging cable to a position where a vehicle may be recharged.

The present description may provide several advantages. In particular, the approach may improve a person's ability to charge a vehicle. Further, the approach may provide geographical directions to vehicle occupants based on ease of recharging a vehicle. Additionally, the approach may tailor charging cable heating to match a vehicle operator's capability to maneuver charging cables so that charging cables may not have to be unnecessarily heated.

It may be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
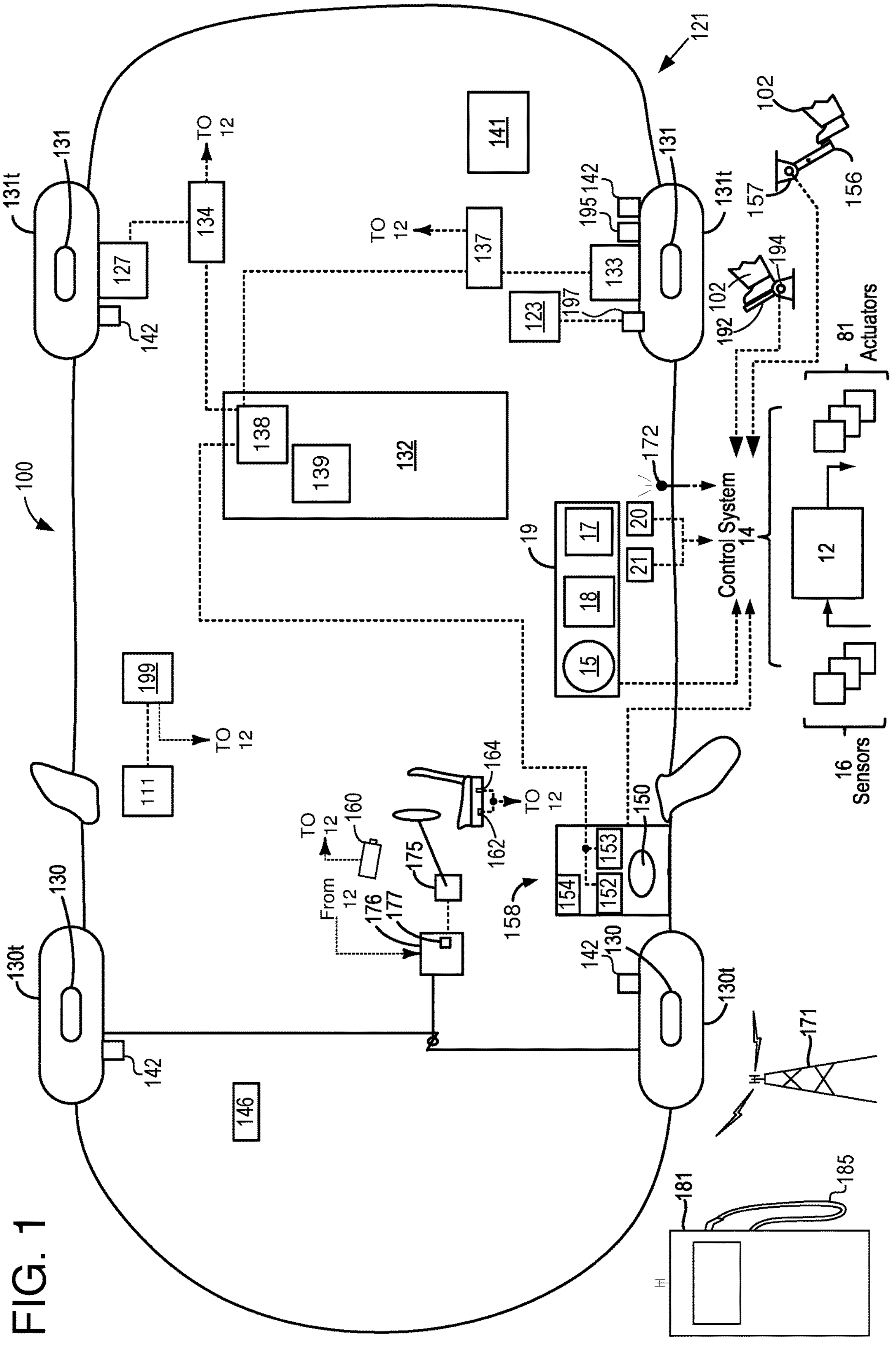
FIG. 1 is a schematic diagram of an example vehicle driveline and electric power system.
Figure 2:
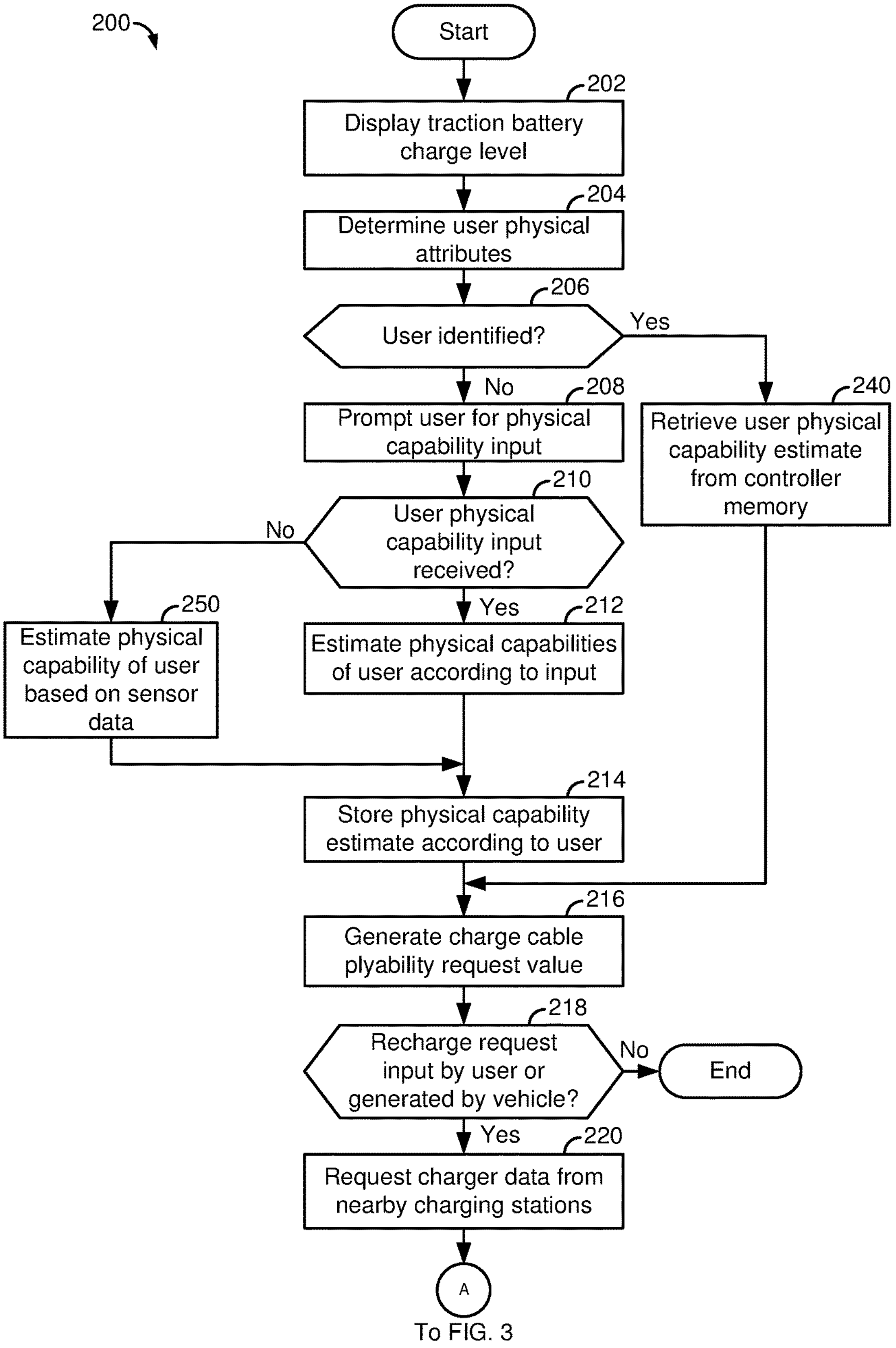
FIGS. 2 and 3 show an example method for a vehicle.
Figure 3:
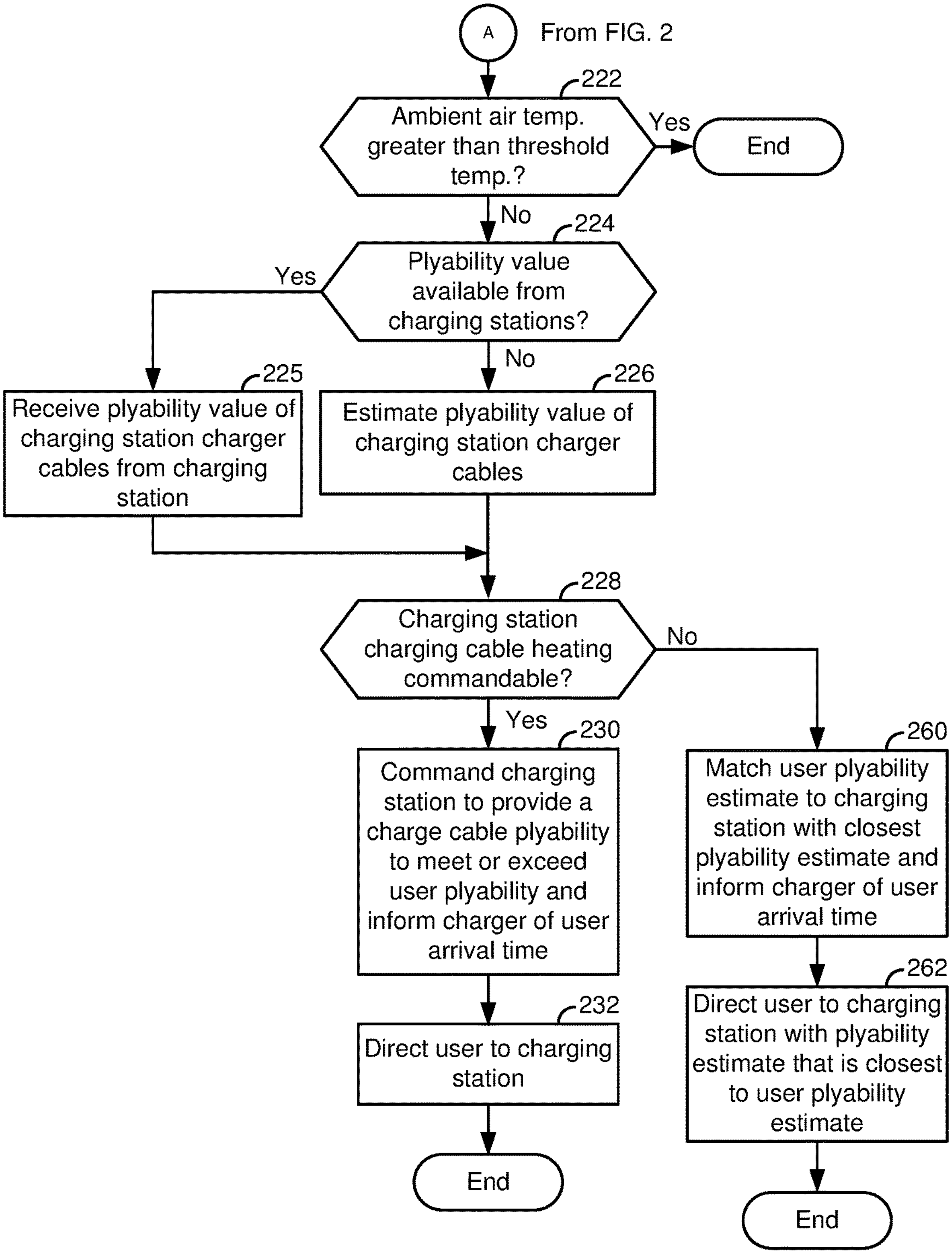
Figure 4:
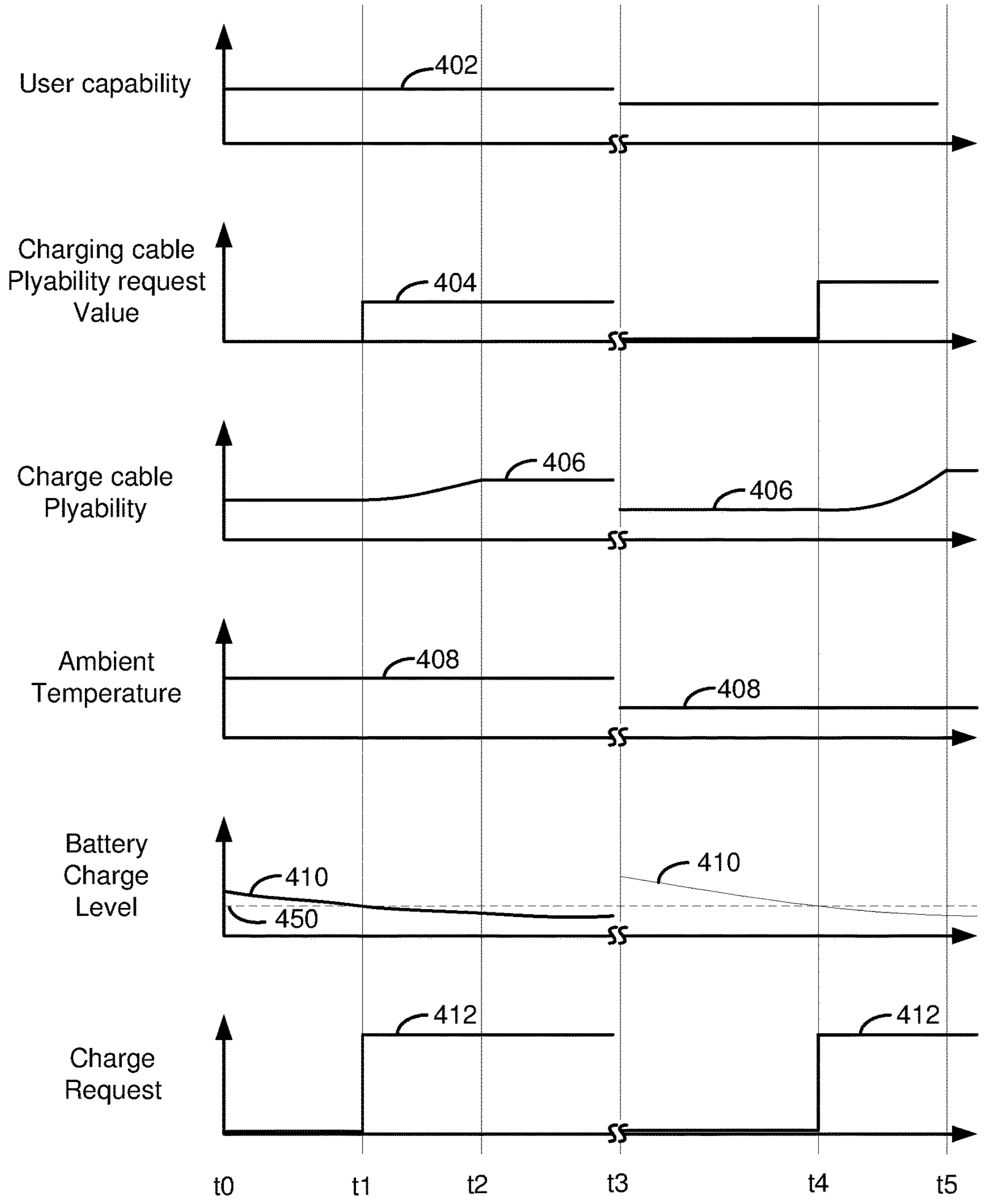
FIG. 4 is a sequence of preparing to charge a vehicle according to the method of FIGS. 2 and 3.
Figure 5:
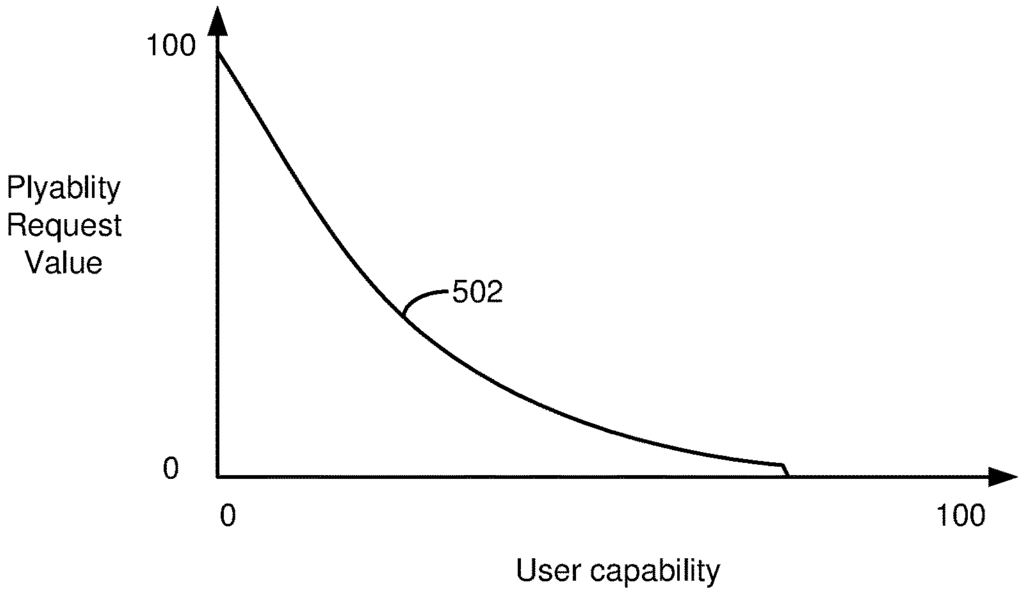
FIGS. 5 and 6 show example relationships for preparing to charge a vehicle.
Figure 6:
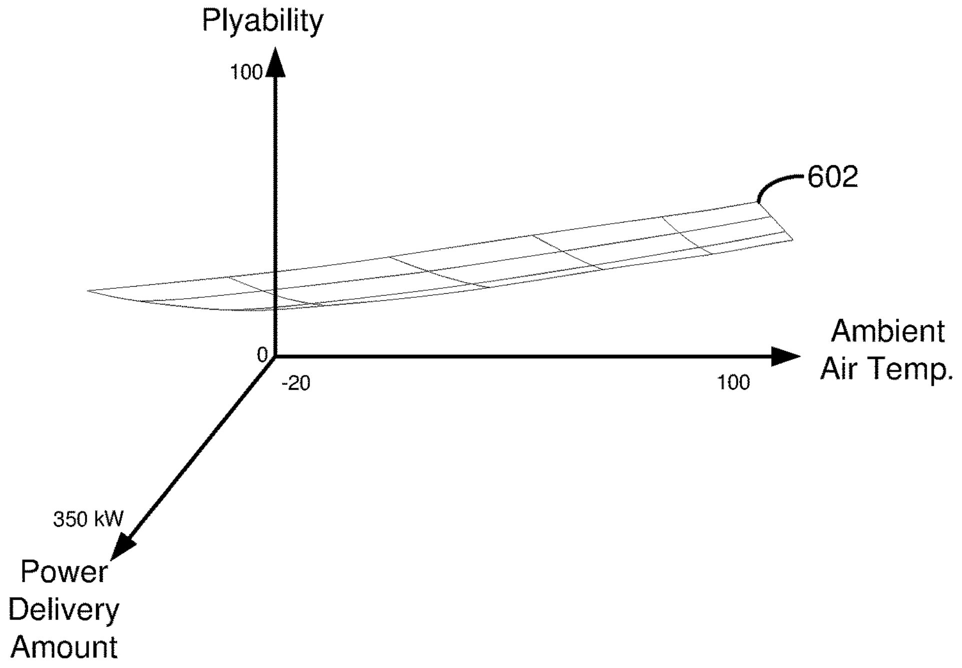
Figure 7:
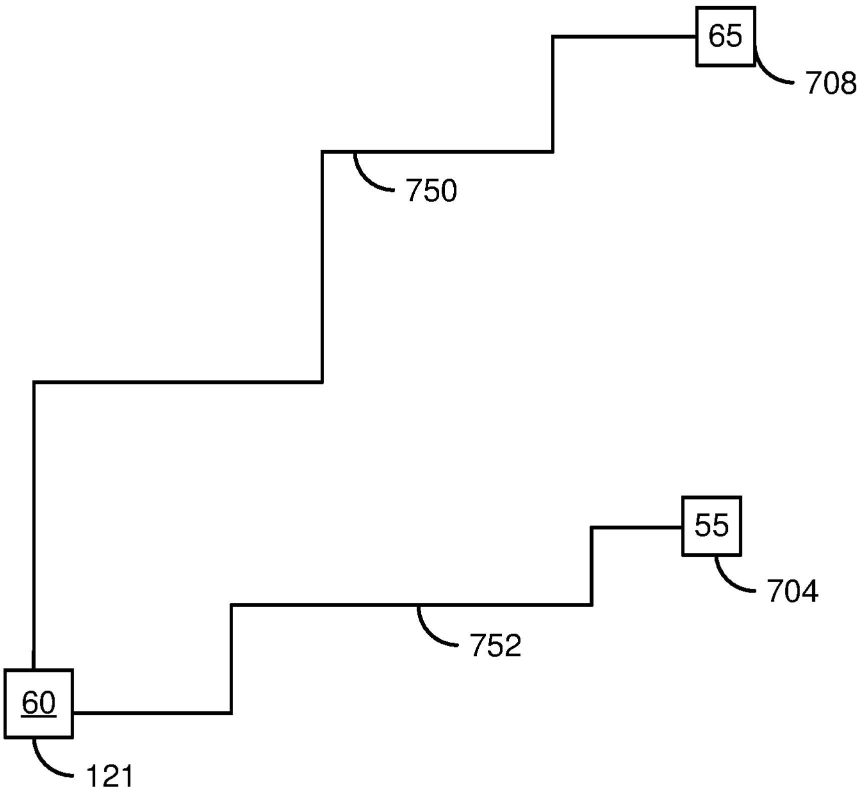
FIG. 7 shows example navigation instructions for preparing to charge a vehicle.

The following description relates to systems and methods for preparing to charge an electric vehicle. FIG. 1 shows a non-limiting example vehicle configuration for an electric vehicle that includes a traction battery (e.g., a battery that supplies electric charge to an electric machine that provides propulsive effort for a vehicle) that is charged via an external charging grid. A method of preparing for charging an electric vehicle is shown in FIGS. 2 and 3. An example of preparing for charging a vehicle is shown in FIG. 4. FIGS. 5 and 6 show example relationships that may be applied for preparing for charging of a vehicle. Finally, FIG. 7 shows example navigational instructions for preparing for charging of a vehicle.

FIG. 1 illustrates an example vehicle propulsion system 100 for vehicle 121. In this example, vehicle propulsion system 100 includes two electric machines that may be applied to propel vehicle 121. Throughout the description of FIG. 1, mechanical connections between various components are illustrated as solid lines, whereas electrical connections between various components are illustrated as dashed lines.

In this example, vehicle propulsion system 100 includes a first electric machine 127 that is coupled to solely one wheel. Vehicle propulsion system 100 also includes a second electric machine 133 that is coupled solely to one wheel. In this example, the rear wheels are driven, but in other examples the front wheels may also be driven.

A first inverter system controller 134 may convert alternating current generated by electric machine 127 to direct current for storage at the electric energy storage device 132 and vice versa. A second inverter system controller 137 may convert alternating current generated by second electric machine 133 to direct current for storage at the electric energy storage device 132 and vice versa.

Electric machine 127 and electric machine 133 are controlled via controller 12. The controller 12 receives signals from the various sensors shown in FIG. 1. In other examples, two or more controllers may perform the functions and operations of controller 12. In addition, controller 12 employs the actuators shown in FIG. 1 to adjust driveline operation based on the received signals and instructions stored in memory of controller 12.

Vehicle propulsion system 100 includes front wheels 130 and rear wheels 131. In this example, one rear wheel is coupled to electric machine 127 and the other rear wheel is coupled to electric machine 133. Electric machines 127 and 133 may receive electrical power from onboard electrical energy storage device 132. Furthermore, electric machines 127 and 133 may provide a generator function to convert the vehicle's kinetic energy into electrical energy, where the electrical energy may be stored at electric energy storage device 132 for later use by the electric machine 127 and/or 133. A first inverter system controller (ISC1) 134 may convert alternating current generated by electric machine 127 to direct current for storage at the electric energy storage device 132 and vice versa. A second inverter system controller (ISC2) 137 may convert alternating current generated by electric machine 133 to direct current for storage at the electric energy storage device 132 and vice versa. Electric energy storage device 132 may be referred to as a traction battery since it may supply electric charge to electric machines (e.g., 127 and 133) that provide propulsive effort to vehicle 121.

In some examples, electric energy storage device 132 may be configured to store electrical energy that may be supplied to other electrical loads residing on-board the vehicle (other than the motor), including cabin heating and air conditioning, engine starting, headlights, cabin audio and video systems, etc.

Control system 14 may communicate with one or more of electric machine 127, energy storage device 132, electric machine 133, etc. Control system 14 may receive sensory feedback information from one or more of electric machine 133, electric machine 127, energy storage device 132, etc. Further, control system 14 may send control signals to one or more of electric machine 133, electric machine 127, energy storage device 132, etc., responsive to this sensory feedback. Control system 14 may receive an indication of an operator requested output of the vehicle propulsion system from a human operator 102, or an autonomous controller. For example, control system 14 may receive sensory feedback from driver demand pedal position sensor 194 which communicates with driver demand pedal 192. Similarly, control system 14 may receive an indication of an operator requested vehicle braking via a human operator 102, or an autonomous controller. For example, control system 14 may receive sensory feedback from brake pedal position sensor 157 which communicates with brake pedal 156.

Energy storage device 132 may periodically receive electrical energy from a charging station 181. Charging station 181 may be comprised of a single charger that includes a controller, multiple chargers and charger controllers, multiple chargers including controllers and servers where the servers are configured to exchange data with one or more chargers and one or more networks 171 (e.g., internet, cellular network, satellites, etc.). Charging station 181 may supply electric charge to vehicle traction battery charging port 150 via cable 185.

Charging station 181 may supply AC or DC power may be received via a traction battery charging port 150. The traction battery charging port 150 may include separate terminals or connections for AC and DC power. In the present example, traction battery charging port 150 may be part of a vehicle charging module 158. Vehicle charging module 158 may include an AC/DC converter 152, a DC/DC converter 153, and power management and communication circuitry 154. AC/DC converter 152 converts AC power at a first voltage to DC power at a second voltage that is appropriate for charging traction battery 132. DC/DC converter 153 converts DC power at a first DC voltage to DC power at a second DC voltage that is appropriate for charging traction battery 132. Power management and communications circuitry 154 may allow controller 12 to communicate with charging station 181. Further, controller 12 may communicate with charging station 181 from a distance via transceiver 172. Transceiver 172 allows vehicle 121 to send and receive data from charging station 181. Charging station 181 may be electrically coupled to an electric power grid (not shown) and charging station may include a transceiver (not shown).

While the vehicle propulsion system is operated to propel the vehicle, charging cable 185 may be disconnected from vehicle 121. Control system 14 may identify and/or control the amount of electrical charge stored at the energy storage device 132, which may be referred to as the state of charge (SOC).

Electric energy storage device 132 includes an electric energy storage device controller 139. Electric energy storage device controller 139 may provide charge balancing between energy storage element (e.g., battery cells) and communication with other vehicle controllers (e.g., controller 12).

Vehicle propulsion system 100 may also include inertial sensors 199. Inertial sensors 199 may comprise one or more of the following: longitudinal, latitudinal, vertical, yaw, roll, and pitch sensors (e.g., accelerometers). Axes of yaw, pitch, roll, lateral acceleration, and longitudinal acceleration are as indicated. The control system may adjust electric machine output and/or the torque vectoring electric machines to increase vehicle stability in response to sensor(s) 199. In another example, the control system may adjust an active suspension system 111 responsive to input from inertial sensors 199. Active suspension system 111 may comprise an active suspension system having hydraulic, electrical, and/or mechanical devices, as well as active suspension systems that control the vehicle height on an individual corner basis (e.g., four corner independently controlled vehicle heights), on an axle-by-axle basis (e.g., front axle and rear axle vehicle heights), or a single vehicle height for the entire vehicle. Data from inertial sensor 199 may also be communicated to controller 12, or alternatively, sensors 199 may be electrically coupled to controller 12.

One or more tire pressure monitoring sensors (TPMS) may be coupled to one or more tires (e.g., 130*t* and 131*t*) of wheels (e.g., 130 and 131) in the vehicle. For example, FIG. 1 shows a tire pressure sensor 197 coupled to wheel 131 and configured to monitor a pressure in a tire 131*t* of wheel 131. While not explicitly illustrated, it may be understood that each of the four tires indicated in FIG. 1 may include one or more tire pressure sensor(s) 197. Furthermore, in some examples, vehicle propulsion system 100 may include a pneumatic control unit 123. Pneumatic control unit may receive information regarding tire pressure from tire pressure sensor(s) 197, and send said tire pressure information to control system 14. Based on said tire pressure information, control system 14 may command pneumatic control unit 123 to inflate or deflate tire(s) of the vehicle wheels. While not explicitly illustrated, it may be understood that pneumatic control unit 123 may be used to inflate or deflate tires associated with any of the four wheels illustrated in FIG. 1. For example, responsive to an indication of a tire pressure decrease, control system 14 may command pneumatic control system unit 123 to inflate one or more tire(s). Alternatively, responsive to an indication of a tire pressure increase, control system 14 may command pneumatic control system unit 123 to deflate tire(s) one or more tires. In both examples, pneumatic control system unit 123 may be used to inflate or deflate tires to an optimal tire pressure rating for said tires, which may prolong tire life.

One or more wheel speed sensors (WSS) 195 may be coupled to one or more wheels of vehicle propulsion system 100. The wheel speed sensors may detect rotational speed of each wheel. Such an example of a WSS may include a permanent magnet type of sensor.

Vehicle propulsion system 100 may further include an accelerometer 20. Additionally, vehicle propulsion system 100 may further include an inclinometer 21. Vehicle propulsion system 100 may also include a steering control system 176 that may adjust a steering angle via adjusting a position of steering motor 177.

Vehicle propulsion system 100 may further include a brake system control module (BSCM) 141 to apply and release friction wheel brakes 142. In some examples, BSCM 141 may comprise an anti-lock braking system, such that tires (e.g., **130*t* and 1311) of wheels (e.g. 130, 131**) may maintain tractive contact with the road surface according to driver inputs while braking, which may thus prevent the wheels from locking up, to prevent skidding.

Vehicle propulsion system 100 may further include a motor electronics coolant pump (MECP) 146. MECP 146 may be used to circulate coolant to diffuse heat generated by at least electric machine 127 and electric machine 133 of vehicle propulsion system 100, and the electronics system. MECP may receive electrical power from onboard energy storage device 132, as an example.

Controller 12 may comprise a portion of a control system 14. In some examples, controller 12 may be a single controller of the vehicle. Control system 14 is shown receiving information from a plurality of sensors 16 (various examples of which are described herein) and sending control signals to a plurality of actuators 81 (various examples of which are described herein). As one example, sensors 16 may include tire pressure sensor(s) 197, wheel speed sensor(s) 195, inertial sensors 199, etc. In some examples, steering angle sensor 175, sensors associated with electric machine 133 and electric machine 127, etc., may communicate information to controller 12, regarding various states of electric machine operation.

Vehicle propulsion system 100 may also include an on-board navigation system 17 (for example, a Global Positioning System) on dashboard 19 that an operator of the vehicle may interact with. The navigation system 17 may include one or more location sensors for assisting in estimating a location (e.g., geographical coordinates) of the vehicle. For example, on-board navigation system 17 may receive signals from GPS satellites (not shown), and from the signal identify the geographical location of the vehicle. In some examples, the geographical location coordinates may be communicated to controller 12.

Dashboard 19 may further include a display system 18 configured to display information to the vehicle operator. Display system 18 may comprise, as a non-limiting example, a touchscreen, or human machine interface (HMI), display which enables the vehicle operator to view graphical information as well as input commands. In some examples, display system 18 may be connected wirelessly to the internet (not shown) via controller (e.g. 12). As such, in some examples, the vehicle operator may communicate via display system 18 with an internet site or software application (app).

Dashboard 19 may further include an operator interface 15 via which the vehicle operator may adjust the operating status of the vehicle. Specifically, the operator interface 15 may be configured to initiate and/or terminate operation of the vehicle driveline (e.g., electric machine 133 and electric machine 127) based on an operator input. Various examples of the operator interface 15 may include interfaces that apply a physical apparatus, such as an active key, that may be inserted into the operator interface 15 to activate electric machines 133 and 127, or may be removed to shut down the electric machines 133 and 127 to turn off the vehicle. Other examples may include a passive key that is communicatively coupled to the operator interface 15. The passive key may be configured as an electronic key fob or a smart key that does not have to be inserted or removed from the operator interface 15 to operate the electric machines 133 and 127. Rather, the passive key may need to be located inside or proximate to the vehicle (e.g., within a threshold distance of the vehicle). Control system 14 may estimate attributes (e.g., height, weight, body mass index, identity, etc.) based on output of camera 160, support position sensor 162, and strain gauge 164.

Thus, the system of FIG. 1 provides for a vehicle system, comprising: a transmitting device; a controller including executable instructions that cause the controller to transmit to a charger, via the transmitting device, data that is a basis for adjusting pliability of a charging cable. In a first example, the vehicle system includes where the data includes a value represents a requested level of pliability of the charging cable. In a second example that may include the first example, the vehicle system further comprises additional executable instructions that cause the controller to assign a first value to an attribute of a human and transmit the requested level of pliability of the charging cable to a charging station, where the requested level of pliability of the charging cable is based on the first value. In a third example that may include one or more of the first through second examples, the vehicle system further comprises sensors to sense one or more attributes of a human. In a fourth example that may include one or more of the first through third examples, the vehicle system further comprises additional executable instructions that cause the controller to generate a value for charging cable pliability based on the one or more attributes of the human. In a fifth example that may include one or more of the first through fourth examples, the vehicle system includes where the value is included in the data. In a sixth example that may include one or more of the first through fifth examples, the vehicle system further comprises additional executable instructions to transmit a request for data from one or more charging stations. In a seventh example that may include one or more of the first through sixth examples, the vehicle system includes where the data includes usage data for the one or more charging stations. In an eighth example that may include one or more of the first through seventh examples, the vehicle system includes where the usage data includes time since most recently not supplying charge to a vehicle.

Referring now to FIGS. 2 and 3, an example method for operating an electric vehicle is shown. The method of FIGS. 2 and 3 may be incorporated into and may cooperate with the systems of FIG. 1. Further, at least portions of the method of FIGS. 2 and 3 may be incorporated as executable instructions stored in non-transitory memory while other portions of the method may be performed via a controller transforming operating states of devices and actuators in the physical world.

At 202, method 200 displays a state of charge (SOC) amount for the traction battery. The SOC for the traction battery may be displayed via a human/machine interface. Method 200 proceeds to 204.

At 204, method 200 determines physical attributes (e.g., height, weight, body mass index (BMI), etc.). Method 200 may estimate the height of a user via support position. Method 200 may estimate weight of a user via output of a strain gauge. Method 200 may estimate the user's BMI by indexing a table or function of BMI values using user height and weight estimates. Further, method 200 may identify a user via facial recognition or other known identity detection methods using vehicle sensors (e.g., a camera). Method 200 proceeds to 206.

At 206, method 200 judges whether or not the user has been identified. If so, the answer is yes and method 200 proceeds to 240. Otherwise, the answer is no and method 200 proceeds to 208.

At 240, method 200 retrieves a user physical capability estimate from controller memory. In one example, the physical capability estimate may be a numerical value that has a specific range (e.g., 0-1 or 0-100). The lower the numeric value, the lower is the user's capability of performing physical tasks. For example, a person that has to use a wheel chair to move outside the vehicle may have a user capability estimate of 0.5 or 50. On the other hand, a person with an athletic build and no physical limitations may have a user capability of 1 or 100. Method 200 proceeds to 216 after retrieving the user's physical capability estimate.

At 208, method 200 prompts the user to input parameters from which a physical capability estimate may be generated. The user may be prompted via a display of a human/machine interface. The user may be prompted to put in numeric values for their own physical attributes (e.g., age, gender, height, weight, disabilities, etc.). Method 200 proceeds to 210.

At 210, method 200 judges whether or not the user's (e.g., vehicle operator or passenger) physical capability input has been received. If so, the answer is yes and method 200 proceeds to 212. Otherwise, the answer is no and method 200 proceeds to 250.

At 250, method 200 estimates the user's physical capability value. Method 200 may use sensor inputs to estimate the user's attributes (e.g., height, weight, etc.), and the user attributes may be a basis for determining the user's physical capability value. For example, a strain gauge on a driver's support may output a value that corresponds to the user's weight as observed on a support. The user's weight may then be input to a function that outputs an estimate of the user's total weight (e.g., weight observed on the support plus an estimate of the weight of the user's legs). Further, the position of the support may be a basis for estimating the user's height since the position of the support may be indicative of the user's leg length. For example, the position of the support may index or reference a table that outputs an estimate of the user's height that is based on the position of the support recognizing that the user positions the support to use the user controls (e.g., brake pedal). The user's age may be estimated from data on the internet. The user attributes may be input to a regression formula to estimate the user's physical capability. In one example, the user's physical capability may be estimated via the following equation:

$$\text{Physical\_capability} = A1 \cdot \text{Age}^{b1} + A2 \cdot \text{height}^{b2} + A3 \cdot \text{weight}^{b3} + \ldots$$

where Physical_capability is the user's physical capability rating value, A1 is a first multiplier coefficient for fitting the regression, Age is a parameter value that is based on the user's age, b1 is a real number for fitting the regression, A2 is a second multiplier coefficient for fitting the regression, height is a parameter value that is based on the user's weight, b2 is a real number for fitting the regression, A2 is a third multiplier coefficient for fitting the regression, weight is a parameter value that is based on the user's weight, and b3 is a real number for fitting the regression. Of course, other methods for determining a numerical value that represents a user's physical capabilities may also be provided. Method 200 proceeds to 214.

At 212, method 200 estimates the user's physical capability rating value based on the input that is provided by the user. In one example, the user's physical capability may be estimated via a regression as described at 250. Method 200 proceeds to 214.

At 214, method 200 stores the user's physical capability estimate to controller memory according to user identification. For example, user 1 may have a physical capability estimate of 66 while user 2 may have physical capability estimate of 88. The user capabilities may be stored for subsequent use. Method 200 proceeds to 216.

At 216, method 200 generates a charging cable pliability (e.g., a quality of being flexible) value. The charging cable pliability value may be part of a request to adjust a charging cable pliability so that a user may experience an acceptable level of charging cable stiffness during cold ambient air temperatures. In one example, method 200 may reference a table or function that outputs a charging cable pliability value according to a user's physical capability estimate. One example of such a function is shown in FIG. 5. The charging cable pliability value may increase as a user's physical capability value decreases. Higher charging cable pliability values may be requested of a charging station to increase pliability of a charger's charging cables (e.g., make the charging cables more flexible). Lower charging cable pliability values may be requested of a charging station to decrease pliability of a charger's charging cables (e.g., make the charging cables less flexible). Values in the table may be empirically determined via conducting consumer clinics and receiving feedback on whether or not the effort to manipulate charging cables to prepare for vehicle charging is less or more than may be desired. Method 200 proceeds to 218.

At 218, method 200 judges whether or not a vehicle recharging request has been generated automatically or by a user. A vehicle recharge request may be generated automatically when battery SOC is less than a threshold state of charge. Alternatively, a user may generate a request for recharging the vehicle and/or accumulating data so that the user may select a charger for charging the vehicle. If method 200 judges that a user or automatic request has been generated to recharge the vehicle or to gather data from charging stations so that the user may make an informed decision selecting a charging station, the answer is yes and method 200 proceeds to 220. Otherwise, the answer is no and method 200 proceeds to exit.

At 220, method 200 sends out a request for vehicle charger data from nearby vehicle charging stations. Method 200 may send out a request to a server that is dedicated to providing data from charging stations that are near the vehicle's present location. Alternatively, method 200 may send out individual requests to individual vehicle charging stations. Method 200 receives the data from the vehicle charging stations. The data may include but is not limited to an amount of time since an individual charging station most recently stopped providing charge to a vehicle (e.g., an amount of time that the individual charging station has not been providing charge), price data, charging station capabilities data, individual charging station usage data, temperature of the charging cable, physical characteristics and/or the name brand of the charging cable, hours of operation, an estimated pliability value for the charging stations charging cable, etc. Method 200 receives the data and proceeds to 222.

At 222, method 200 judges whether or not ambient air temperature is greater than a threshold temperature (e.g., 7 degrees Celsius). If so, the answer is yes and method 200 proceeds to exit. Otherwise, the answer is no and method 200 proceeds to 224. An ambient air temperature that is greater than the threshold temperature may be indicative of a charging cable having an acceptable level of flexibility to permit vehicle charging. Method 200 proceeds to 224.

At 224, method 200 judges whether or not a pliability value is available for vehicle charging stations or a particular vehicle charging station. If so, the answer is yes and method 200 proceeds to 225. Otherwise, the answer is no and method 200 proceeds to 226.

At 225, method 200 requests and receives estimated pliability values from nearby charging stations for charging cables of the charging stations. Method 200 proceeds to 228.

At 226, method 200 estimates a pliability value for nearby charging station charging cables. In one example, method 200 may receive from a charging station, or have stored in controller memory, manufacturer's data that may be referenced via ambient air temperature and an electric power delivery amount in the last predetermined amount of time (e.g., is the last or most recent 10 minutes) to estimate a pliability value for charging cables at a particular charging station. FIG. 6 shows example data that may be stored in memory of the controller. The data may be stored in a table or function and referenced by the controller. The function or table outputs a pliability value. Method 200 proceeds to 228.

At 228, method 200 judges whether or not one or more of the nearby vehicle charging stations accept commands or input for heating charging cables. If so, the answer is yes and method 200 proceeds to 230. Otherwise, the answer is no and method 200 proceeds to 260.

Additionally, method 200 may select a charging station as the charging station that is to provide charge to the vehicle. Method 200 may apply several criteria to the selection of the charging station. For example, method 200 may select a charging station that supplies charge at the lowest cost and that has cable pliability that is near to or that may be commanded to the charging cable pliability value request as determined at 216. The charging station may be selected from a group of nearby charging stations.

At 230, method 200 may determine whether or not there is a difference between the present pliability of charging cables for a particular charging station as determined from data received from the charging stations or as estimated by the controller. If the present pliability estimate for charging cables of a charging station is less than the value of the charging cable pliability request value as determined at step 216, method 230 requests of the charging station a higher pliability value for the charging cables of the charging station. If the present pliability estimate is greater than the value of the charging cable pliability request, method 200 may not issue a pliability adjustment request to the charging station. The charging station may actively heat the charging station cables to increase the pliability of the charging cables. The controller may provide an arrival time to the charging station before the vehicle reaches the charging station so that the charging station has time to meet the pliability request value. Further, the controller may request to reserve a block of charging time so that the charging station may be available when the vehicle arrives. Method 200 proceeds to 232.

At 232, method 200 directs the user to the charging station via providing driving directions to the user. The driving directions may be provided in the form of a visual aid (e.g., map and/or point to point directions) that is provided via a navigation system. Method 200 proceeds to exit.

At 260, method 200 matches the pliability estimate value request as determined at step 216 with a nearest charging station that has a charging cable pliability values that are equal to or greater than the pliability estimate value request determined at step 216. For example, if a pliability request value is 60 and a first charging station that is 20 kilometers away has chargers with charging cable pliability values that are above 65, a second charging station is 18 kilometers away has chargers having charging cable pliability values of 55, and a third charging station 25 kilometers away has chargers with charging cable pliability value above 61, then method 200 selects the first charging station to provide charge to the vehicle. Method 200 proceeds to 262. At 262, method 200 directs the user to the selected charging station via providing driving directions to the user. The driving directions may be provided in the form of a visual aid (e.g., map and/or point to point directions) that is provided via a navigation system. Method 200 proceeds to exit.

In this way, method 200 may identify a value for charging cable pliability and select a charging system based at least in part on the charging cable pliability. The selection may be based on one or more of charging cost, charging cable pliability, and distance to the charging station.

Thus, the method of FIGS. 2 and 3 provides for a vehicle operating method, comprising: providing directions via a navigation system in response to one or more charging cable pliability estimates. In a first example, the vehicle operating method includes where the one or more charging cable pliability estimates are generated via a controller of a vehicle. In a second example that may include the first example, the vehicle operating method includes where the one or more charging cable pliability estimates are generated via a controller external to a vehicle. In a third example that may include one or more of the first and second examples, the vehicle operating method further comprises requesting an adjustment to pliability of a charging cable via a controller of a vehicle. In a fourth example that may include one or more of the first through third examples, the vehicle operating method includes where requesting the adjustment to a pliability of the charging cable includes transmitting a request to increase the pliability of the charging cable. The charging cable pliability may be increased via providing additional heat to the charging cable. In a fifth example that may include one or more of the first through fourth examples, the vehicle operating method includes where the directions are to a charging station.

The method of FIGS. 2 and 3 also provides for a vehicle operating method, comprising: via a controller, transmitting to a vehicle charging station, data that is a basis for adjusting a charging cable pliability. In a first example, the vehicle system includes where the data is a value, and wherein the value is based on one or more attributes of a human. In a second example that may include the first example, the vehicle system includes where the one or more attributes of the human are determined via vehicle sensors. In a third example that may include one or more of the first through second examples, the vehicle system further comprises providing directions via a navigation system in response to one or more charging cable pliability estimates. In a fourth example that may include one or more of the first through third examples, the vehicle operating method includes where the directions are to a charging station.

Turning now to FIG. 4, an example prophetic sequence to prepare an electric vehicle for charging is shown. The operating sequence of FIG. 4 may be produced via the system of FIG. 1 executing instructions of the method described in FIGS. 2 and 3. The plots of FIG. 4 are aligned in time and occur at the same time. Vertical markers at t0-t5 indicate times of particular interest during the sequence. The SS marks along the horizontal axes of each plot represent breaks in time and the breaks may have a duration that is long or short.

The first plot from the top of FIG. 4 represents a value that quantifies physical capability of a human user or driver of a vehicle versus time. The vertical axis represents the value of the physical capability of a particular human to perform physical tasks and the human's capability increases in the direction of the vertical axis arrow. The horizontal axis represents time and time increases from the left side to right side of the figure. Trace 402 represents the physical capability of a particular human to perform physical tasks.

The second plot from the top of FIG. 3 represents a level of a request to adjust pliability of a charging cable versus time. The vertical axis represents the level of the request to adjust pliability of a charging cable and the request is asserted when trace 404 is higher than the horizontal axis. The request is not asserted when trace 404 is near the level of the horizontal axis. The vertical height of the request to adjust pliability of the charging cable is the requested pliability of the charging cable and the requested pliability increases in the direction of the vertical axis arrow. The horizontal axis represents time and time increases from the left side to right side of the figure. Trace 404 represents the level of the request to adjust pliability of a charging cable.

The third plot from the top of FIG. 4 represents a quantified value for pliability of a charging cable of a charging station (e.g., a charging cable pliability request value) that is selected to deliver charge to a vehicle. The vertical axis represents the quantified value for pliability of a charging cable of a charging station and the quantified value for pliability of a charging cable of a charging station increases (indicating a more pliable or flexible charging cable) in the direction of the vertical axis arrow. The horizontal axis represents time and time increases from the left side to right side of the figure. Trace 406 represents the quantified value for pliability of a charging cable of a charging station.

The fourth plot from the top of FIG. 4 represents an ambient air temperature versus time. The vertical axis represents the ambient air temperature and the ambient air temperature increases in the direction of the vertical axis arrow. The horizontal axis represents time and time increases from the left side to right side of the figure. Trace 408 represents the ambient air temperature.

The fifth plot from the top of FIG. 3 represents a battery charge level versus time. The vertical axis represents the battery charge level and the battery charge level increases in the direction of the vertical axis arrow. The horizontal axis represents time and time increases from the left side to right side of the figure. Trace 410 represents the battery charge level. Horizontal trace 450 represents a threshold level below which an electric charging request may be automatically generated.

The sixth plot from the top of FIG. 3 represents a state of a request to charge an electric vehicle versus time. The vertical axis represents the state of the request to charge an electric vehicle and the request is asserted when trace 412 is near the level of the tip of the arrow along the vertical axis. The request is not asserted when trace 412 is near the level of the horizontal axis. The horizontal axis represents time and time increases from the left side to right side of the figure. Trace 412 represents the state of the request to charge the electric vehicle.

At time t0, the request to charge the electric vehicle is not asserted and the battery charge level is above threshold 450. The ambient air temperature is at a middle level and the charging cable pliability request is not asserted. The physical capability of the human user of the vehicle is at a higher middle level.

At time t1, request to charge the traction battery of the electric vehicle is asserted in response to the battery charge level falling below threshold 450. The vehicle to be charged is not at the charging station when the request is generated. The ambient air temperature is unchanged and the charging cable pliability is unchanged. The level of the request to adjust pliability of the charging cable at a selected charging station is increased to a middle level and the adjustment to pliability is based on the user's physical capability and the present pliability of the charging cable of the selected charging station. The user's physical capability is unchanged.

Between time t1 and t2, the charging station (not shown) provides heat to the charging cable to meet the charging cable pliability request value. The charging cable pliability increases in response to heating of the charging cable (not shown). The user's physical capability, the charging cable pliability request value, ambient air temperature, and charging request remain unchanged. The vehicle reaches the charging station shortly after time t2 (not shown). Between time t2 and time t3, there is a break in the sequence.

At time t3, the request to charge the electric vehicle is not asserted and the battery charge level is above threshold 450. The ambient air temperature is at a lower level and the charging cable pliability request is not asserted. The physical capability of the human user of the vehicle is at a middle level.

At time t4, request to charge the traction battery of the electric vehicle is asserted in response to the battery charge level falling below threshold 450. The vehicle to be charged is not at the charging station when the request is generated. The ambient air temperature is unchanged and the charging cable pliability is unchanged. The level of the request to adjust pliability of the charging cable at a selected charging station is increased to a higher middle level and the adjustment to pliability is based on the user's physical capability and the present pliability of the charging cable of the selected charging station. The user's physical capability is unchanged.

Between time t4 and t5, the charging station (not shown) provides heat to the charging cable to meet the charging cable pliability request value. The charging cable pliability increases in response to heating of the charging cable (not shown). The user's physical capability, the charging cable pliability request value, ambient air temperature, and charging request remain unchanged. The vehicle reaches the charging station shortly after time t5 (not shown).

Thus, the charging cable pliability request level at time t4 is greater than the charging cable pliability request level at time t1. This is because the user's physical capability is lower at time t4 than at time t1. The amount of heating that is provided via the charging station to the charging cable at the charging station at time t4 may be increased as compared to the amount of heating that is provided to the charging cable at time t1 because of the lower ambient air temperature and the lower physical capability of the user at time t4. Accordingly, the pliability of a charging cable may be adjusted responsive to user attributes, ambient air temperature, and charging cable pliability.

Referring now to FIG. 5, a plot of an example function or relationship that relates a user's physical capability to perform a physical task and a value of a pliability request for a charging cable is shown. The vertical axis represents the value of the pliability request for the charging cable and the value increases in the direction of the vertical axis. The higher the value the more flexible the charging cable may be to lower the effort by the user to put the charging cable in position to charge the vehicle. The horizontal axis represents a user's physical capability to perform physical tasks and the user's capability is increased (the user is deemed more capable to perform the physical task) in the direction of the horizontal axis arrow.

Trace 502 represents a relationship between the user's physical capability to perform a physical task with respect to the pliability request for a charging cable. Trace 502 indicates that a lower user capacity provides for a higher pliability request value. Thus, for less capable user's, the additional charging cable pliability is requested.

Referring now to FIG. 6, a plot of an example function or relationship that relates ambient air temperature and an electric power delivery amount in the last predetermined amount of time to a pliability level or value for a charging cable is shown. The vertical axis represents the estimated pliability value for the charging cable and the estimated pliability value increases in the direction of the vertical axis. The higher the value the more flexible the charging cable may be to lower the effort by the user to put the charging cable in position to charge the vehicle. The horizontal axis represents ambient air temperature and the other axis represents the electric power delivery amount for a last predetermined amount of time.

Mesh 602 represents a relationship between ambient air temperature and an electric power delivery amount in the last predetermined amount of time to a pliability level or value for a charging cable. Mesh 602 indicates that a lower ambient air temperatures mean lower charging cable pliability and lower power delivery amounts mean lower charging cable pliability. Thus, at lower ambient air temperatures and lower power delivery amounts, there is a lower level of charging cable pliability.

Referring now to FIG. 7, example directions for navigating to a charging station are shown. In this example, vehicle 121 is shown at a first position. Vehicle 121 is requesting a charging cable pliability level of 60 as indicated. A first charging station 708 is indicated at a second position and the first charging station has a charging cable pliability level of 65. A second charging station 704 is indicated at a second position and the second charging station has a charging cable pliability level of 55.

Vehicle 121 may select the first charging station as the charging station to provide charge to the vehicle since it meets the requested charging cable pliability level of 60. The navigation system of vehicle 121 may generate directions 750 to lead the driver of the vehicle to the first charging station. The navigation system of vehicle 121 does not generate directions 752 in this example because the second charging station cannot provide the desired level of charging cable pliability.

Thus, vehicle 121 may select a charging station based on a capability of the charging station to provide a desired level of charging cable pliability. The vehicle 121 may provide a visual aid for the user to follow so that the user may have capacity to move the charging cables and recharge the vehicle.

Note that the example control and estimation routines included herein can be used with various vehicle and powertrain configurations. The control methods and routines disclosed herein may be stored as executable instructions in non-transitory memory and may be carried out by the control system including the controller in combination with the various sensors, actuators, and other engine hardware.

Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to induction electric machines and permanent magnet electric machines. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims may be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A vehicle system, comprising:
- a transmitting device;
- one or more sensors configured to sense one or more physical attributes of a user, wherein the one or more physical attributes include one or more of age, gender, height, weight and disabilities;
- a controller including executable instructions that cause the controller to:
  - generate a physical capability estimate for the user based on the one or more physical attributes sensed by one of the one or more sensors;
  - generate a requested level of pliability of a charging cable based on the physical capability estimate, wherein the requested level of pliability increases as the physical capability estimate decreases;

transmit to a charger, via the transmitting device, data that includes the requested level of pliability of the charging cable; and command a charging station to physically heat the charging cable to achieve the requested level of pliability before an arrival time of the user at the charging station.

2. The vehicle system of claim 1, wherein the controller transmits the arrival time to the charging station to enable pre-heating of the charging cable prior to the user's arrival.

3. The vehicle system of claim 2, further comprising additional executable instructions that cause the controller to assign a first value to one of the one or more physical attributes of the user, where the requested level of pliability of the charging cable is based on the first value.

4. The vehicle system of claim 1, wherein the one or more sensors include a strain gauge.

5. The vehicle system of claim 4, further comprising additional executable instructions that cause the controller to select the charging station from one or more charging stations.

6. The vehicle system of claim 5, wherein the controller selects the charging station from the one or more charging stations that has a cable pliability that supplies charge at a lowest cost and may be commanded to the requested level of pliability of the charging cable.

7. The vehicle system of claim 1, further comprising additional executable instructions to transmit a request for data from one or more charging stations.

8. The vehicle system of claim 7, where the data includes usage data for the one or more charging stations.

9. The vehicle system of claim 8, where the usage data includes time since most recently not supplying charge to a vehicle.

10. A vehicle operating method, comprising:

generating, via a controller of a vehicle, a physical capability estimate for a user of the vehicle based on one or more physical attributes, wherein one of the one or more physical attributes are sensed by one or more sensors;

generating, via the controller of the vehicle, a requested level of pliability of a charging cable based on the physical capability estimate, wherein the requested level of pliability increases as the physical capability estimate decreases, receiving, via the controller of the vehicle, one or more charging cable pliability estimates from one or more controllers of charging stations, selecting, via the controller of the vehicle, a charging station from the one or more charging stations based on the one or more charging cable pliability estimates, providing, to a user, directions to the selected charging station via a navigation system; and commanding the charging station to provide a charge cable pliability based on the one or more charging cable pliability estimates by heating the charging cable before an arrival time of the user, wherein the controller transmits the arrival time of the user to the charging station prior to the user's arrival to enable pre-adjustment of the charging cable.

11. The vehicle operating method of claim 10, where the one or more charging cable pliability estimates are generated via the controller of a vehicle, the method further comprising, receiving, at the one or more controllers of the charging stations, the charge cable pliability and the arrival time of the user, the one or more controllers of the charging stations adjusting heating in response to the received arrival time of the user and the charge cable pliability.

12. The vehicle operating method of claim 10, where the one or more charging cable pliability estimates are generated via the one or more controllers of the charging stations.

13. The vehicle operating method of claim 10, further comprising requesting an adjustment to pliability of a charging cable via a controller of a vehicle, wherein a first charging cable pliability request level at a first time is greater than a second charging cable pliability request level at a second time, wherein a user's physical capability is lower at the first time compared to the second time, wherein an amount of heating that is provided via the charging station to the charging cable at the charging station at the first time is increased as compared to the amount of heating that is provided to the charging cable at the second time because of a lower ambient air temperature and a lower physical capability of the user at the first time.

14. The vehicle operating method of claim 13, where requesting the adjustment to the pliability of the charging cable includes transmitting a request to increase the pliability of the charging cable.

15. The vehicle operating method of claim 10, where the directions are to a charging station.

16. A vehicle operating method, comprising:

via a controller, transmitting to a vehicle charging station, data that includes a requested level of pliability of a charging cable, where the controller generates the requested level of pliability of the charging cable based on a physical capability estimate, wherein the controller generates the physical capability estimate based on one or more physical attributes of the user, wherein the one or more physical attributes of the user are sensed by one or more sensors; and commanding the charging station to heat the charging cable to achieve the requested level of pliability before an arrival time of the user, wherein the controller transmits the arrival time of the user to the charging station to enable pre-heating of the charging cable prior to the user's arrival.

17. The vehicle operating method of claim 16, where the one or more physical attributes of the user include one or more of age, gender, height, weight, and disabilities.

18. The vehicle operating method of claim 16, where the requested level of pliability increases as the physical capability estimate decreases.

19. The vehicle operating method of claim 16, further comprising providing directions via a navigation system in response to one or more charging cable pliability estimates.

20. The vehicle operating method of claim 19, where the directions are to the charging station.

* * * * *